Patented Mar. 2, 1943

2,312,878

UNITED STATES PATENT OFFICE 2,312,878

ALKALI METAL SALTS OF β-SULPHOPROPIONITRILE AND METHOD OF PREPARATION

Erwin L. Carpenter, Old Greenwich, Conn., assignor to American Cyanamid Company, New York, N. Y., a corporation of Maine No Drawing. Application April 17, 1942,
Serial No. 439,392

8 Claims. (Cl. 260—464)

The present invention relates to alkali metal salts of β-sulphopropionitrile and to a method of preparing the same.

These new compounds may be used as intermediate products for the synthesis of chemotherapeutic agents and assistants for the textile and related industries such as wetting, cleansing, softening and dispersing agents.

I have discovered a simple and convenient method of preparing an alkali metal salt of β-sulphopropionitrile which comprises reacting acrylonitrile with an alkali metal bisulphite in aqueous solution. For example, sodium bisulphite readily adds to the unsaturated nitrile according to the equation

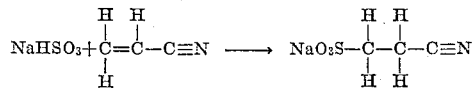

In carrying out the process substantially equimolecular quantities of the alkali metal bisulphite and acrylonitrile are used. The nitrile is added to a well cooled reaction vessel containing an aqueous solution of the bisulphite salt. An exothermic reaction occurs on addition of the nitrile, and the temperature is maintained between 20° C. and 50° C. by external cooling and by adding the nitrile in portions. After the reaction is completed the major portion of the water is removed by distillation under reduced pressure. Precipitation of the product may be assisted by adding an aliphatic alcohol of low molecular weight such as methyl or ethyl alcohol to the concentrated aqueous solution.

While the use of an alkali metal bisulphite and acrylonitrile in equimolecular proportions is the preferred procedure, it is within the scope of this invention to use an excess of either reagent. The preferred temperature range for the reaction is 20° C.-50° C., but temperatures below and above this are operable.

The invention is illustrated more fully by the following examples, in which the quantities are stated in parts by weight.

EXAMPLE 1

100 parts of sodium bisulphite and 100 parts of water were added to a reaction vessel equipped with a reflux condenser and stirring device. 52 parts of acrylonitrile were then added dropwise over a period of one hour with good agitation of the solution. The mixture started to heat as soon as the nitrile was added, and the temperature was maintained at 40° C.-45° C. during the addition by immersion of the vessel in ice water. After all of the acrylonitrile had been added, the reaction mixture was stirred and held at approximately 45° C. for one hour, then cooled to room temperature and allowed to stand 16 hours. The water was removed by distillation under reduced pressure, and the product recrystallized from a methyl alcohol-water mixture. The sodium salt of β-sulphopropionitrile was obtained in good yield as a white powdery solid of very fine crystals having a melting point of 232° C.-235° C.

Analysis of $NaO_3SCH_2CH_2CN$

|  | Theoretical | Found |
| --- | --- | --- |
|  | Per cent | Per cent |
| Nitrogen | 8.92 | 8.75 |
| Sulphur | 20.40 | 20.52 |

The compound is somewhat hygroscopic. It is stable (i. e., $NaHSO_3$ is not easily split out). It is very soluble in water, moderately soluble in methyl alcohol-water mixtures, sparingly soluble in absolute methyl alcohol, and insoluble in absolute ethyl alcohol, ether and acetone.

EXAMPLE 2

11.6 parts of acrylonitrile were added to a solution consisting of 24 parts of potassium bisulphite and 53.5 parts of water according to the procedure of Example 1. The temperature of the reaction mixture was maintained at about 50° C. After completing the reaction, the solution was cooled and allowed to stand 16 hours. By evaporation under reduced pressure and then addition of ethyl alcohol, 24.7 parts of the potassium salt of β-sulphopropionitrile were obtained. The crystalline product (without recrystallization) analyzed 7.41% nitrogen. (Theory, 8.09% nitrogen.)

The products obtained according to this invention may be converted into the corresponding amides, acids and esters by hydrolysis. Imido ethers, amidines and cyanalkines can be prepared by known reactions involving the nitrile group. Reduction yields the corresponding amines. Salts of other metals can be readily prepared by double decomposition reactions. The sulpho group can also be reduced to sulphinic acid or a mercaptan, and converted to esters or amides.

The above reaction serves as a convenient method for destroying quantities of residual acrylonitrile in water. In polymerization reactions involving acrylonitrile, reaction is not always carried to completion. Under these circumstances residual quantities of unpolymerized acrylonitrile remain in the reaction product which in some cases it has been found necessary to remove. This may be done by washing the reaction product with water. The problem then presents itself of disposing of the dilute aqueous solution of acrylonitrile as the latter has been shown to be quite toxic. The residual acrylonitrile may be destroyed by adding an alkali metal bisulphite thereto prior to conducting this wash water to waste.

While the invention has been described with particular reference to specific embodiments, it is to be understood that it is not to be limited thereto but is to be construed broadly and restricted solely by the scope of the appended claims.

I claim:

1. The method of preparing an alkali metal salt of β-sulphopropionitrile which comprises reacting acrylonitrile with an alkali metal busilphite in aqueous solution.

2. The method of preparing an alkali metal salt of β-sulphopropionitrile which comprises reacting acrylonitrile with an alkali metal bisulphite in aqueous solution, separating and recovering the alkali metal salt of β-sulphopropionitrile.

3. The method of claim 2 wherein the reaction is carried out at a temperature within the range of from 20° C. to 50° C.

4. The method of claim 2 wherein substantially equimolecular proportions of the reactants are used.

5. The method of preparing the sodium salt of β-sulphopropionitrile which comprises reacting acrylonitrile with sodium bisulphite in aqueous solution at a temperature of about 40° C. to 45° C., separating and recovering the sodium salt of β-sulphopropionitrile.

6. An alkali metal salt of β-sulphopropionitrile.

7. The sodium salt of β-sulphopropionitrile.

8. The potassium salt of β-sulphopropionitrile.

ERWIN L. CARPENTER.